United States Patent
Trinh et al.

(10) Patent No.: US 11,269,154 B2
(45) Date of Patent: Mar. 8, 2022

(54) CAMERA DEVICE FOR A VEHICLE FOR DRIVER OBSERVATION

(71) Applicant: Robert Bosch GmbH, Stuttgart (DE)

(72) Inventors: Hoang Trinh, Gerlingen (DE); Juergen Pachur, Lehrensteinsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 352 days.

(21) Appl. No.: 16/039,653

(22) Filed: Jul. 19, 2018

(65) Prior Publication Data

US 2019/0025537 A1    Jan. 24, 2019

(30) Foreign Application Priority Data

Jul. 20, 2017   (DE) .......................... 102017212478.4

(51) Int. Cl.
| | |
|---|---|
| *G02B 7/02* | (2021.01) |
| *B60R 11/04* | (2006.01) |
| *H04N 5/225* | (2006.01) |
| *B60R 11/00* | (2006.01) |

(52) U.S. Cl.
CPC ............... *G02B 7/02* (2013.01); *B60R 11/04* (2013.01); *H04N 5/2254* (2013.01); *B60R 2011/001* (2013.01); *B60R 2011/0022* (2013.01)

(58) Field of Classification Search
CPC ..... G02B 7/02; B60R 11/04; B60R 2011/001; B60R 2011/0022; H04N 5/2254
USPC ........................................................ 359/830
See application file for complete search history.

(56) References Cited

U.S. PATENT DOCUMENTS

| | | | | |
|---|---|---|---|---|
| 5,274,456 | A | * 12/1993 | Izumi ................... | H04N 5/2254 348/207.99 |
| 2002/0116106 | A1 | * 8/2002 | Breed ................... | B60N 2/002 701/45 |
| 2004/0035933 | A1 | * 2/2004 | Havens .............. | G06K 7/10722 235/454 |
| 2010/0289104 | A1 | * 11/2010 | Ra ..................... | H01L 27/14618 257/459 |
| 2014/0313337 | A1 | 10/2014 | Devota et al. | |

FOREIGN PATENT DOCUMENTS

DE     102010052730 A1    5/2012

\* cited by examiner

*Primary Examiner* — Marin Pichler
*Assistant Examiner* — Mitchell T Oestreich
(74) *Attorney, Agent, or Firm* — Norton Rose Fulbright US LLP; Gerard Messina

(57) ABSTRACT

A camera device for a vehicle for driver observation, the camera device having a lens holder having a lens and a plurality of soldering pins, the soldering pins being situated on a side of the lens holder opposite the lens, in order to enable a soldering of the lens holder onto a circuit board.

12 Claims, 4 Drawing Sheets

CAMERA DEVICE FOR A VEHICLE FOR DRIVER OBSERVATION

CROSS REFERENCE

The present application claims the benefit under 35 U.S.C. § 119 of German Patent Application No. DE 102017212478.4 filed on Jul. 20, 2017, which is expressly incorporated herein by reference in its entirety.

BACKGROUND INFORMATION

The present invention relates to a device and a method for driver observation.

Typically, conventional SMD-based lens holders for vehicle interior compartment cameras for driver observation are equipped with one- or two- or multi-camera systems, and in addition have a camera module having an active near-field infrared illumination system.

SUMMARY

In accordance with an example embodiment of the present invention, a camera device is provided for a vehicle for driver observation, and a method for producing a camera device. Through the measures described herein, advantageous developments and improvements of the device are possible.

An example camera device for a vehicle for driver observation is provided, the camera device having the following feature:

a lens holder having a lens and a plurality of soldering pins situated on a side of the lens holder opposite the lens, in order to enable soldering of the lens holder onto a circuit board.

A camera device can be a camera module, for example a miniaturized camera module, having a lens and a lens holder that can be situated on a circuit board. A vehicle can be a vehicle for conveying persons, for example a vehicle that drives in highly automated fashion. A lens holder can be used to position a camera lens over an image sensor and to center the optical axis over the active sensor surface. Here, the lens holder can be mounted on a circuit board. A lens can be an optical system that produces a real optical image of an object. The circuit board can be a bearer for electronic components.

According to a specific example embodiment of the present invention, the camera device can include a metal insert part that forms the plurality of soldering pins. This realization suggests itself in particular if the lens holder is produced using an injection-molding method.

According to a specific example embodiment of the present invention, the lens holder can be made of a plastic injection-molded part. Using an injection molding method, in a short time a large number of shaped parts made of plastic can be produced; these shaped parts can be used directly, and they can be given almost any desired surface structure.

According to a specific example embodiment of the present invention, at least one of the plurality of soldering pins, or the plurality of soldering pins, can be configured in a zigzag geometry and/or a double-L structure on a metal insert part of the circuit board. Such a configuration of the soldering pins on the metal insert part of the circuit board has the advantage that the distance between the soldering pins is minimized, and in this way the aperture and the lens of the camera are better protected against dust particles and moisture.

According to a specific example embodiment of the present invention, at least one of the plurality of soldering pins, or the plurality of soldering pins, can be formed as a ring. A ring has the advantage that penetration of particles into a region surrounded by the ring is prevented.

According to a specific example embodiment of the present invention, an open space between each two adjacent pins of the plurality of soldering pins can be less than 0.5 mm. The spacing between the plurality of soldering pins should be kept as small as possible in order to enable better protection of the aperture and the lens of the camera against dust particles and moisture.

According to a specific example embodiment of the present invention, an orienting pin, which may be situated on a side of the lens holder opposite the lens, can orient the lens holder on the circuit board. Through the orienting pin, a floating and/or an orienting behavior of the lens holder on the solder can be prevented.

According to a specific example embodiment of the present invention, the plurality of soldering pins can be soldered to the circuit board. The circuit board can here include an image sensor and/or an image or electronics system or image sensor electronics system that can process the image acquired by the camera.

According to a specific example embodiment of the present invention, a vehicle can be equipped with a camera device, the camera device being installed in the interior compartment of the vehicle, in the A-pillar or steering column of the vehicle. The camera device is here installed in a camera housing, and is used for driver observation in order for example to indicate inattentiveness or tiredness of the driver.

An example embodiment of method in accordance with the present invention includes the following steps:

providing a lens and a plurality of soldering pins;

joining the lens and the plurality of soldering pins to form a lens mount having the lens and the plurality of soldering pins, which are situated on a side of the lens holder opposite the lens, in order to enable soldering of the lens holder onto a circuit board.

Exemplary embodiments of the present invention are shown in the figures and are explained in detail below.

DETAILED DESCRIPTION OF EXAMPLE EMBODIMENTS

Figure 1:
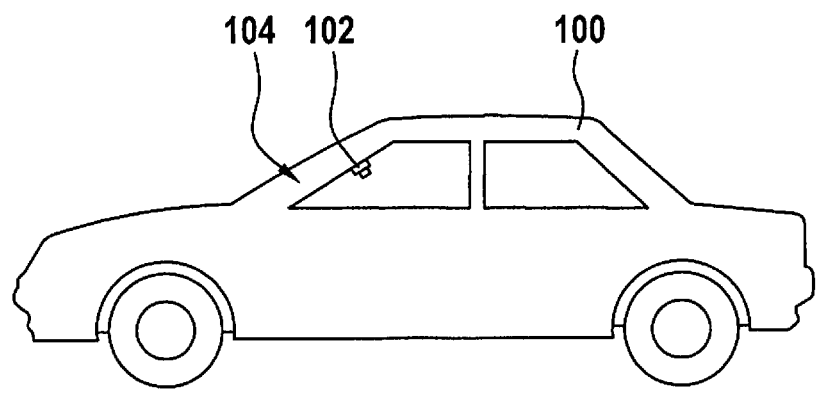
FIG. 1 shows a vehicle together with a camera device according to an exemplary embodiment.

In the description below of advantageous exemplary embodiments of the present invention, identical or similar reference characters are used for the elements shown in the various Figures having similar function, and repeated description of these elements is omitted.

FIG. 1 shows a vehicle 100 together with a camera device 102 according to an exemplary embodiment. Vehicle 100 includes camera device 102, camera device 102 being situated in the interior compartment of vehicle 100 on A-pillar 104 according to an exemplary embodiment.

For safe travel in a highly automated vehicle 100, the driver's ability to react is of the greatest importance, even when the driver is not actively driving vehicle 100. Therefore, driver assistance systems acquire, inter alia, the driver and his capacity to take over guidance of the vehicle. A camera device 102 for driver observation is focused on the degree of attentiveness or distractedness of the driver, the attentiveness or distractedness of the driver being capable of being acquired by sensors and influenced. Likewise, lack of engagement or fatigue of the driver can be detected by a camera device 102 in the vehicle interior compartment.

Camera device 102 is situated in the interior compartment of vehicle 100, and can for example be installed in an instrument panel or some other installation position. According to an exemplary embodiment, camera device 102 is installed, with a camera housing, in A-pillar 104 of vehicle 100. Here it is important that camera device 102 is protected and sealed against various external influences, such as damaging quantities of dust or falling drops of water, when the housing is inclined up to 15°. Therefore, it is indispensable that there be no open spaces between a plurality of soldering pins situated on a metal insert part of the circuit board. Such gaps, into which dust and moisture can penetrate, are present in particular in the corners of the insert part and of a lens holder. A prevention of the penetration of dust and moisture into camera device 102 is ensured for example by a zigzag geometry and/or double-L structure of the soldering pins on the insert part of the circuit board, because this specific configuration of the soldering pins forms a kind of labyrinth or interleaved barrier that protects the sensitive electronics of camera device 102.

Figure 2:
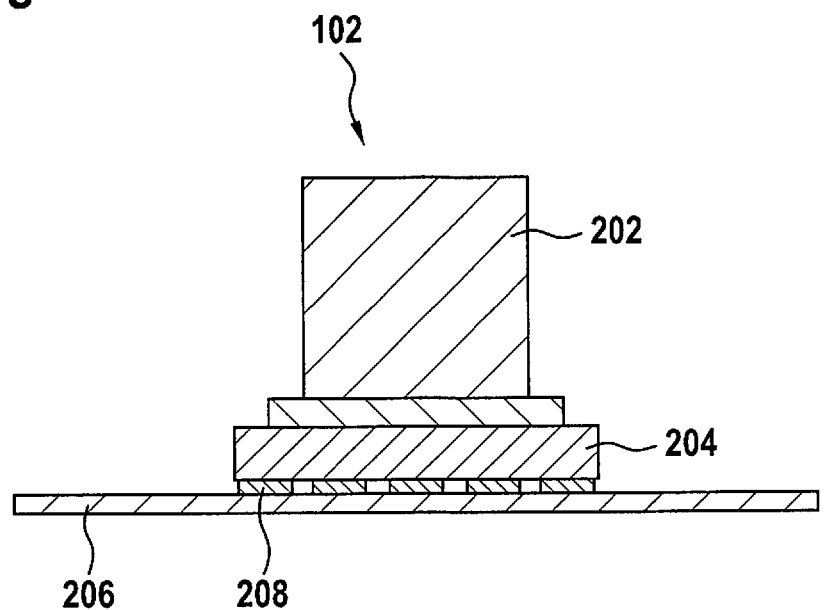
FIG. 2 shows a schematic design of a camera device according to an exemplary embodiment.

FIG. 2 shows a schematic design of a camera device 102 according to an exemplary embodiment. Camera device 102 can for example be camera device 102 shown in FIG. 1 in the interior compartment of the vehicle.

Camera device 102 includes a camera module (not shown), a lens 202, a lens holder 204, and a circuit board 206. The camera module is essentially made up of the components of an image sensor or imager, an imager electronics system situated on circuit board 206, and a plug interface. Lens 202 includes a lens unit that is fixed in lens holder 204 by a glue, in accordance with at least five axial orientations. Lens holder 204 is typically fixed on circuit board 206 by at least two screws. A plurality of soldering pins 208 is soldered on circuit board 206. Soldering pins 208 are here situated on a side of lens holder 204 opposite lens 202 in order to enable lens holder 204 to be soldered on circuit board 206.

The configuration of the plurality of soldering pins 208 typically has a spacing of less than 0.5 mm. Because the lifespan of the optical path of the camera module ideally must not be impaired by dust particles and/or accumulation of moisture, the imager and the lens are protected against contamination and moisture. This can be done completely successfully if the spacing between the plurality of soldering pins 208 on circuit board 206 is kept small enough, and smaller dust particles and moisture can penetrate.

Figure 3:
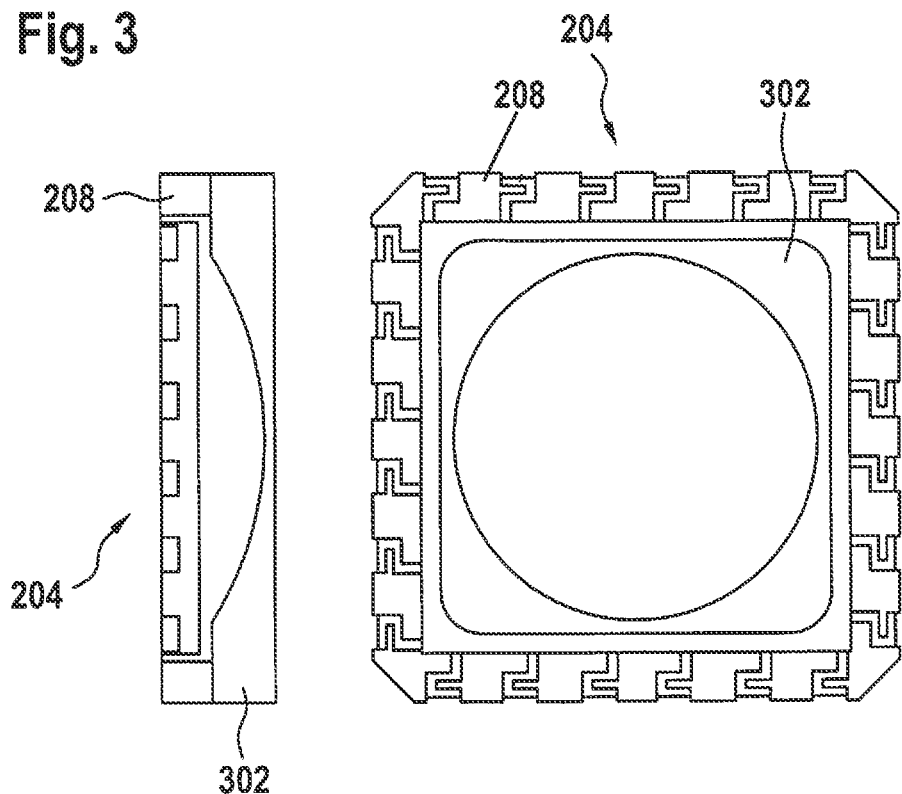
FIG. 3 shows a schematic top view and a profile view of a lens holder according to an exemplary embodiment.

FIG. 3 shows a schematic top view and a profile view of a lens holder 204 according to an exemplary embodiment. Lens holder 204 can for example be lens holder 204 of FIG. 2.

Lens holder 204 is either screwed into a camera module rear housing having a circuit board 206, or is screwed directly to circuit board 206. Lens holder 204 is made of a plastic injection-molded part that has on its lower side a plurality of soldering pins 208 having a stamped and bent profile, or that has a metallization. Due to the plurality of soldering pins 208, lens holder 204 can be produced in the standard SMD soldering process, lens holder 204 being mounted or plugged only onto the surface of circuit board 206.

The plurality of soldering pins 208 on metal insert part 302, which acts as a stamped and bent part, is made interleaved in the direction of the imager, so that a kind of zigzag geometry or double-L structure arises, thereby minimizing the spacing of soldering pins 208 from one another, or completely closing this spacing. Thus, between two adjacent soldering pins 208 there results an open space that is smaller than 0.5 mm. This has the advantage that the imager and the lens are even better protected against external influences.

Figure 4:
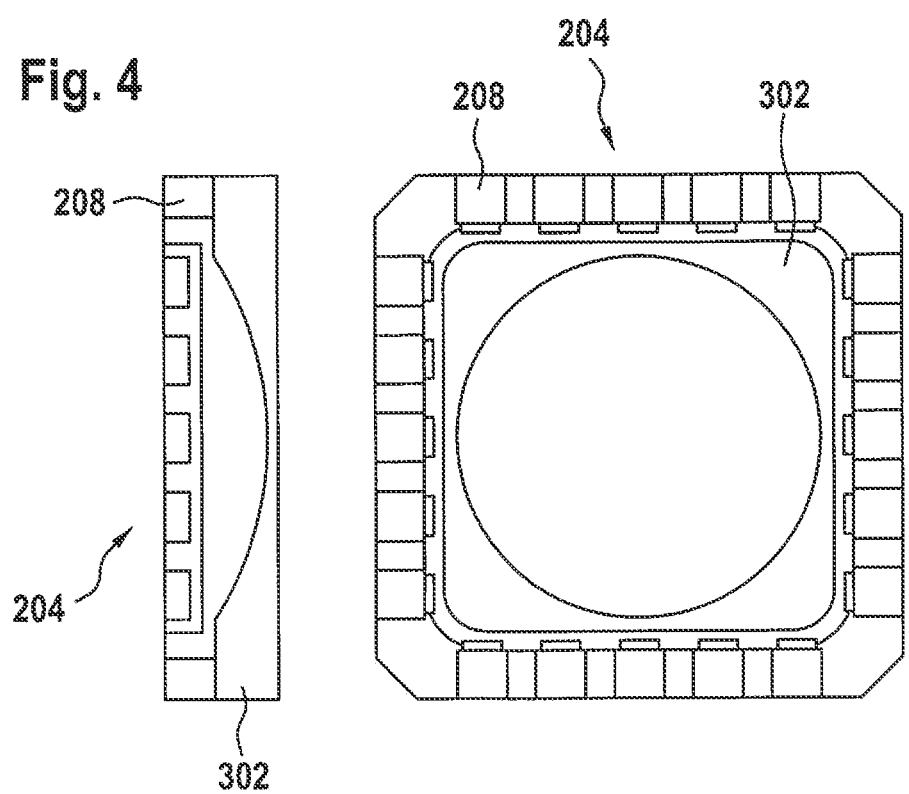
FIG. 4 shows a schematic top view and a profile view of a lens holder according to an exemplary embodiment.

FIG. 4 shows a schematic top view and a profile view of a lens holder 204 according to an exemplary embodiment. Lens holder 204 can for example be lens holder 204 of FIG. 2.

Figure 5:
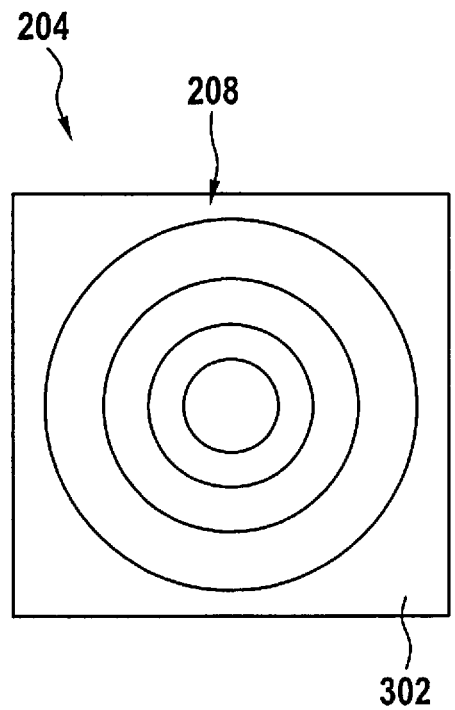
FIG. 5 shows a schematic top view of a lens holder according to an exemplary embodiment.

FIG. 5 shows a schematic top view of a lens holder 204 according to an exemplary embodiment. According to this exemplary embodiment, the solder contact surface, differing from the preceding exemplary embodiments, is designed having a plurality of soldering pins 208 formed as a ring. According to an exemplary embodiment, the solder contact surface can here be designed having at least one, or a plurality of, closed or open rings. According to an exemplary embodiment, a pin 208 is made with an annular shape, and the further pins 208 are for example made round or as solder regions, for example so-called balls, situated within the surface and closed by pin 208 realized as a ring. In this way, it is alternatively also possible to design the solder contact surface having at least one, or a plurality of, strips over its entire surface.

Figure 6:
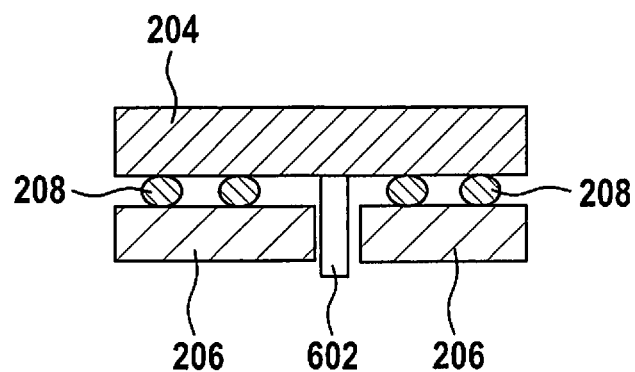
FIG. 6 shows a schematic view of an orienting pin according to an exemplary embodiment.

FIG. 6 shows a schematic view of an orienting pin 602 according to an exemplary embodiment. Here, orienting pin 602 is situated on a side of lens holder 204 opposite the lens, between the plurality of soldering pins 208.

Against a possible floating of lens holder 204 on the solder, orienting pin 602 is provided in the injection-molded part of lens holder 204, in case an excessive orientation offset should occur relative to a target installation position. Alternatively, a full-surface metallization of an injection-molded plastic part can be provided on the side of contacting to circuit board 206. Due to the floating and orientation behavior of lens holder 204 during the reflow solder process, orienting pin 602 is used to prevent possible rotation and/or tilting of lens holder 204.

Figure 7:
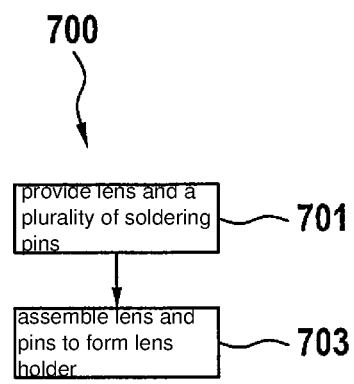
FIG. 7 shows a flow diagram of an exemplary embodiment of a method for producing a camera device according to an exemplary embodiment.

FIG. 7 shows a flow diagram of an exemplary embodiment of a method 700 for producing a camera device according to an exemplary embodiment.

The method includes a step 701 in which a lens and a plurality of soldering pins are provided. Finally, in a step 703, the lens and the plurality of soldering pins are assembled to form a lens holder having the lens and the plurality of soldering pins, which are situated on a side of the lens holder opposite the lens.

If an exemplary embodiment includes an "and/or" linkage between a first feature and a second feature, this is to be read as meaning that according to one specific embodiment the exemplary embodiment has both the first feature and the second feature, and according to a further specific embodiment the exemplary embodiment has either only the first feature or only the second feature.

What is claimed is:

1. A camera device for a vehicle for driver observation, the camera device comprising:
   a lens holder having a lens, and a plurality of soldering pins that are situated on a side of the lens holder opposite the lens, the plurality of soldering pins to enable a soldering of the lens holder onto a circuit board;
   wherein each of the plurality of soldering pins is configured in a zigzag shape, formed on a metal insert part of the circuit board;
   wherein each of the soldering pins has a first portion, a second portion extending from the first portion in a first direction orthogonal to the first portion, and a third portion extending from the first portion in a second direction opposite the first direction, the second portion being spaced from the third portion; and
   wherein adjacent ones of the plurality of soldering pins are nested in one another in such a manner that the second portion of each of the soldering pins extends between the third portion of an adjacent soldering pin of the soldering pins, and an outer edge of the metal insert part.

2. The camera device as recited in claim 1, wherein the lens holder is a plastic injection-molded part.

3. The camera device as recited in claim 1, wherein an open space between each two adjacent pins of the plurality of soldering pins is smaller than 0.5 mm.

4. The camera device as recited in claim 1, further comprising:
   an orienting pin that is situated on a side of the lens holder opposite the lens to orient the lens holder on the circuit board.

5. The camera device as recited in claim 1, further comprising:
   the circuit board, the plurality of soldering pins being soldered to the circuit board.

6. A vehicle having a camera device, the camera device including a lens holder having a lens, and a plurality of soldering pins that are situated on a side of the lens holder opposite the lens, the plurality of soldering pins to enable a soldering of the lens holder onto a circuit board, wherein the camera device is installed in an interior compartment of the vehicle, in one of: an A-pillar of the vehicle, or a steering column of the vehicle;
   wherein each of the plurality of soldering pins is configured in a zigzag shape, formed on a metal insert part of the circuit board;
   wherein each of the soldering pins has a first portion, a second portion extending from the first portion in a first direction orthogonal to the first portion, and a third portion extending from the first portion in a second direction opposite the first direction, the second portion being spaced from the third portion; and
   wherein adjacent ones of the plurality of soldering pins are nested in one another in such a manner that the second portion of each of the soldering pins extends between the third portion of an adjacent soldering pin of the soldering pins, and an outer edge of the metal insert part.

7. A method for producing a camera device, the method comprising:
   providing a lens and a plurality of soldering pins;
   assembling the lens and the plurality of soldering pins to form a lens holder having the lens and the plurality of soldering pins, the soldering pins being situated on a side of the lens holder opposite the lens to enable a soldering of the lens holder onto a circuit board;
   wherein each of the plurality of soldering pins is configured in a zigzag shape, formed on a metal insert part of the circuit board;
   wherein each of the soldering pins has a first portion, a second portion extending from the first portion in a first direction orthogonal to the first portion, and a third portion extending from the first portion in a second direction opposite the first direction, the second portion being spaced from the third portion; and
   wherein adjacent ones of the plurality of soldering pins are nested in one another in such a manner that the second portion of each of the soldering pins extends between the third portion of an adjacent soldering pin of the soldering pins, and an outer edge of the metal insert part.

8. The camera device as recited in claim 1, wherein the plurality of soldering pins are formed along an outer periphery of the metal insert part.

9. The vehicle as recited in claim 6, wherein the plurality of soldering pins are formed along an outer periphery of the metal insert part.

10. The method as recited in claim 7, wherein the plurality of soldering pins are formed along an outer periphery of the metal insert part.

11. The camera device as recited in claim 1, wherein the metal insert part is a stamped and bent part.

12. The camera device as recited in claim 5, wherein the plurality of soldering pins of situated between the lens holder and the circuit board and fix the lens holder to the circuit board.

* * * * *